No. 682,964. Patented Sept. 17, 1901.
G. A. SWENSON.
FIRE EXTINGUISHER.
(Application filed Mar. 1, 1901.)

(No Model.)

WITNESSES:
John W. Bergstrom
T. B. Owens.

INVENTOR
George A. Swenson
BY Munn
ATTORNEYS

UNITED STATES PATENT OFFICE.

GEORGE A. SWENSON, OF BROOKLYN, NEW YORK.

FIRE-EXTINGUISHER.

SPECIFICATION forming part of Letters Patent No. 682,964, dated September 17, 1901.

Application filed March 1, 1901. Serial No. 49,420. (No model.)

*To all whom it may concern:*

Be it known that I, GEORGE A. SWENSON, a citizen of the United States, and a resident of the city of New York, borough of Brooklyn, in the county of Kings and State of New York, have invented a new and Improved Fire-Extinguisher, of which the following is a full, clear, and exact description.

This invention relates to a device for automatically setting into operation a sprinkling apparatus to extinguish a fire in buildings. The device is adapted to be applied to buildings of all classes and is provided, preferably, with two sprinkling-pipes for each device, said pipes leading to different parts of a large room or one to each of two small rooms. Briefly stated, the apparatus comprises a source of water-supply and an automatically-actuated valve for permitting this water to pass into and through the sprinkling-pipes. If desired, an alarm mechanism may be used in conjunction with the extinguisher.

This specification is a specific description of one form of the invention, while the claims are definitions of the actual scope thereof.

Reference is to be had to the accompanying drawings, forming a part of this specification, in which similar characters of reference indicate corresponding parts in both views.

Figure 1:
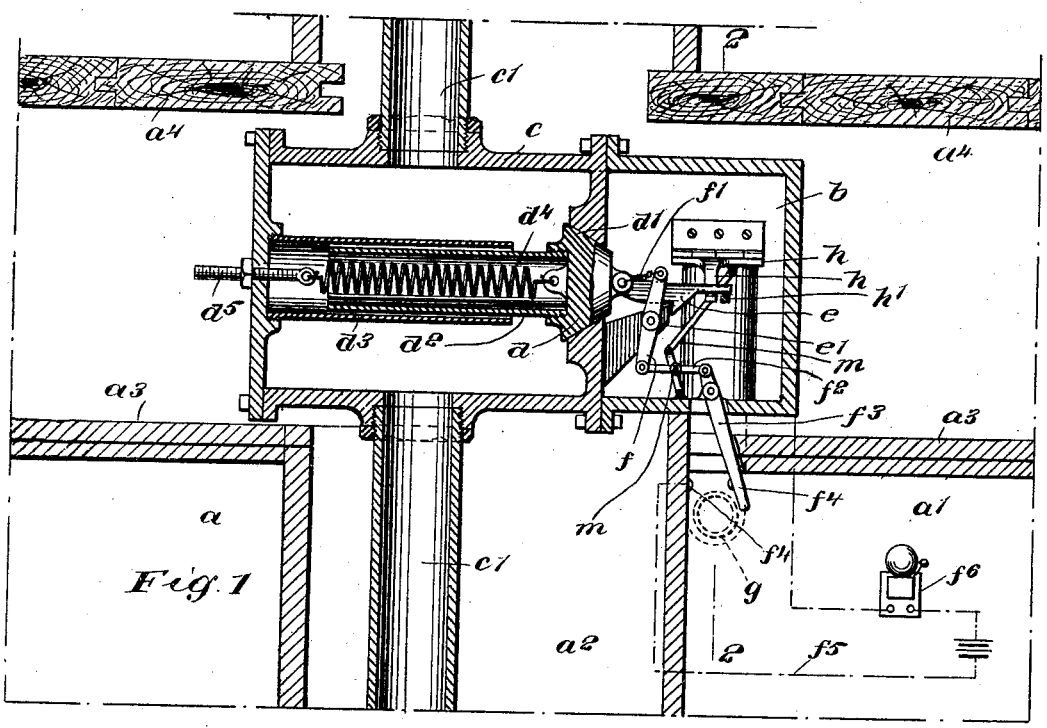
Figure 2:
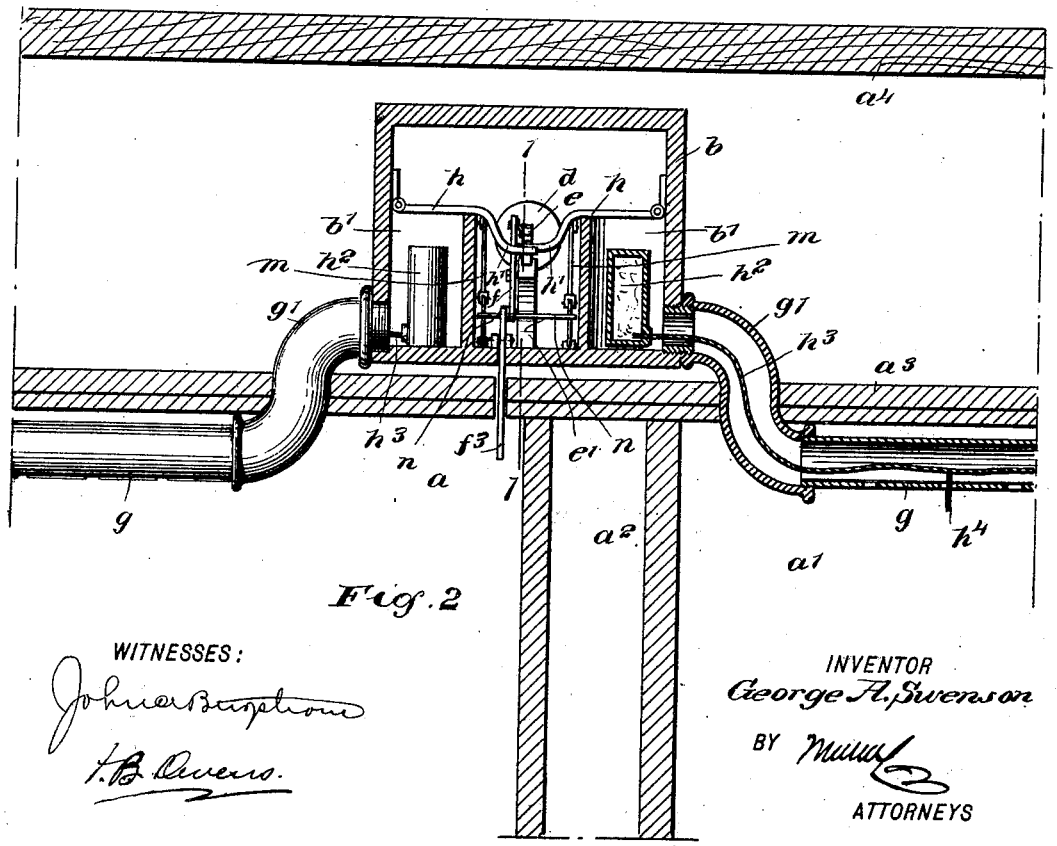

Figure 1 is a sectional view of the invention on the line 1 1 of Fig. 2, and Fig. 2 is a sectional view on the line 2 2 of Fig. 1.

In the drawings, $a$ represents one room or apartment, and $a'$ another room. $a^2$ represents a hollow wall or partition dividing them. $a^3$ represents the ceilings of the rooms, and $a^4$ represents the floors of the rooms above.

In the space between the floor and ceiling is arranged the apparatus forming my invention, and this comprises two boxes or casings $b$ and $c$. The casing $c$ is a water-compartment and is connected with the water-service pipes $c'$, so that the water is continuously under pressure in the casing $c$. The wall dividing the casings $b$ and $c$ is formed with an orifice $d'$ therein, such orifice being commanded by a valve $d$. This valve has a tubular stem $d^2$, fitting in a tubular guide $d^3$, fastened rigidly to the casing $c$. A retractile spring $d^4$ is located in the tubular stem $d^2$ of the valve and connected with the valve at one end. The other end of the spring $d^4$ is held by an adjustable bolt or screw $d^5$. This spring $d^4$ serves to give the valve a normal tendency to open position, and the parts $d^2$ and $d^3$ serve to guide the valve properly in its movement to and from its seat. When the valve $d$ is closed, the water in the casing $c$ is held from entering the casing $b$, but when the valve is open the water flows from the casing $b$ to the casing $c$. Within the casing $b$ is arranged a latch $e$, connected with the valve $d$ and working with a stud $e'$, rigid within the casing $b$, so that when the parts $e$ and $e'$ are engaged the valve $d$ is kept on its seat notwithstanding the pressure of the spring $d^4$. Connected with the valve $d$ by a chain or other flexible connection $f'$ is a lever $f$, fulcrumed on the stud $e'$ and connected by a link $f^2$ at its lower end with a hand-lever $f^3$, which is fulcrumed in the bottom of the casing $b$ and projected downward through said casing and through the ceiling $a^3$ into one of the rooms. When the latch $e$ is raised, the spring $d^4$ draws the valve $d$ to open position, and thus throws the levers $f$ and $f^3$, moving the lever $f^3$ from the position shown in Fig. 1 to its opposite position, in which the lower end of the lever $f^3$ strikes the wall of one of the rooms and is stopped by this engagement. The lever $f^3$ and the adjacent wall of the room may be provided with electrical contacts $f^4$, and these contacts form the terminals of an electric circuit, (indicated at $f^5$,) which circuit includes an alarm-bell or other suitable device $f^6$, whereby to sound an alarm as the extinguisher acts. When the lever $f^3$ moves from the position shown in Fig. 1 to its opposite position and the contacts $f^4$ are brought together, the circuit $f^5$ is closed and the alarm $f^6$ is sounded.

$g$ indicates the two sprinkling-pipes, which are perforated, as shown in Fig. 2, and which are led into the rooms $a$ in any suitable manner. It is immaterial what position these sprinkling-pipes occupy in the rooms as long as they are capable of leading to the rooms the water from the service-pipes $c'$ and sprinkling the rooms in the manner desired by the person feeding the apparatus. The sprinkling-pipes $g$ are provided with goosenecks or other suitable connections $g'$, which extend upward through the ceiling $a^3$ and pass through the walls of the casing $b$, the pipes $g'$, respectively, communicating with inclosures $b'$ within the casing $b$. These inclosures are open at their upper ends and fitted with lids $h$, which are hinged to the walls of the casing $b$ and lie normally on top of the inclosures to seal the same. The lids $h$ are constructed with extensions $h'$, which project toward each other and are passed under the latch $e$. Within the inclosures $b'$ are arranged explosive cartridges $h^2$, sufficiently loaded to raise upon explosion the covers or lids $h$. In connection with these cartridges $h^2$ are fuses $h^3$, which are passed through the sprinkling-pipes $g$ and led to various parts of the building. These fuses may be provided with branches $h^4$, as indicated in Fig. 2, such branches passing out of the perforations in the pipe $g$. The special form of the fuses and their arrangement with respect to the other parts are immaterial. It is sufficient that they lead to various parts of the room, so that if a fire occurs the fuses will be ignited and will lead the fire to the cartridges $h^2$, thus causing the explosion of these elements and throwing up the lids $h$. As the lids $h$ are thrown upward the extensions $h'$ thereof will throw up the latch $e$, disengaging the same from the stud $e'$ and permitting the spring $d^4$ to draw the valve $d$ to open position. The water will now enter the chamber $b$ from the chamber $c$ and will pass into the proper sprinkling-pipe to the seat of the fire, so as to extinguish the same. Connected with the lids $h$ are toggles $m$, the links of which are connected together by a knuckle-joint, such toggles serving to hold the lids raised, and when the valve $d$ is returned to its closed position the toggles are struck by a transverse pin $n$ on the link $f^2$, and thus the lids $h$ are thrown back to closed position.

In connection with this device it should be borne in mind that water is not led to any part of the building except where the fire occurs. For example, should the fire occur in the vicinity of the right-hand sprinkling-pipe (see Fig. 2) only the right-hand cover $h'$ will be raised. The other cover will be kept closed, and the water will only flow from the chamber $b$ into the right-hand inclosure $b'$ and pipe $g$. This avoids needlessly wetting the house. The apparatus will rapidly transmit the fire-alarm and will act almost instantly to open the valve $d$. If desired, the alarm-bell may be independent of the extinguisher.

Having thus described my invention, I claim as new and desire to secure by Letters Patent—

1. The combination of walls forming a chamber, a sprinkling-pipe leading thereto, a cover commanding the pipe, means controlled by a fuse for opening the cover, a valve commanding a water-inlet to the chamber, a latch connected with the valve to hold the same, the latch being released by the cover, and a toggle for holding the cover raised.

2. The combination of a casing having communication with a source of water-supply, a valve commanding the same, a sprinkling-pipe leading from the casing, a cover mounted in the casing and commanding the receiving end of the sprinkling-pipe, an explosive cartridge arranged to open the cover, and a connection between the cover and the valve.

3. In a fire-extinguisher, the combination of two casings having communication with each other, a valve commanding said casings, a spring serving to open the valve, a latch serving to keep the valve closed, a sprinkling-pipe leading from one of the casings, a cover commanding the receiving end of the sprinkling-pipe and having connection with the latch, an explosive cartridge serving to unseat the cover and release the latch, and a fuse in connection with the cartridge, to lead the fire thereto.

4. A fire-extinguisher, having a sprinkling-pipe, a valve commanding the passage of water thereto, a latch holding the valve normally in position, a spring tending to open the valve, a hinged cover engaged with the latch to release the same, an explosive cartridge serving to actuate the cover, and a fuse connected with the cartridge.

5. In a fire-extinguisher, the combination of two casings having communication with each other, a valve commanding said communications, means tending to open the valve, a latch serving to keep the valve closed, a sprinkling-pipe leading from one of the casings, and a cover commanding the receiving end of the sprinkling-pipe and having connection with the latch, to release the same, the cover being adapted to be raised by the explosive action of a cartridge.

6. A fire-extinguisher having a sprinkling-pipe, a valve commanding the passage of water thereto, means tending to open the valve, a latch serving to hold the valve normally closed, and a hinged cover for the sprinkling-pipe, said cover having connection with the latch to release the same and being adapted to be operated by the explosive action of a cartridge.

In testimony whereof I have signed my name to this specification in the presence of two subscribing witnesses.

GEORGE A. SWENSON.

Witnesses:
ADOLF THORSEN,
CHAS. BATTENBERG.